United States Patent
Mao et al.

(10) Patent No.: US 8,142,933 B2
(45) Date of Patent: Mar. 27, 2012

(54) ANODE MATERIAL FOR HIGH POWER LITHIUM ION BATTERIES

(75) Inventors: Zhenhua Mao, Ponca City, OK (US); Bharat S. Chahar, Houston, TX (US)

(73) Assignee: ConocoPhillips Company, Houston, TX (US)

(*) Notice: Subject to any disclaimer, the term of this patent is extended or adjusted under 35 U.S.C. 154(b) by 0 days.

(21) Appl. No.: 12/880,277

(22) Filed: Sep. 13, 2010

(65) Prior Publication Data

US 2011/0070498 A1    Mar. 24, 2011

Related U.S. Application Data

(60) Provisional application No. 61/247,418, filed on Sep. 30, 2009.

(51) Int. Cl.
*H01M 4/505* (2010.01)
(52) U.S. Cl. .......... 429/224; 429/231.8; 429/231.95
(58) Field of Classification Search ............ 429/231.8, 429/224, 231.95
See application file for complete search history.

(56) References Cited

U.S. PATENT DOCUMENTS

| | | | |
|---|---|---|---|
| 4,246,253 A | 1/1981 | Hunter | |
| 4,507,371 A | 3/1985 | Thackeray et al. | |
| 4,828,834 A | 5/1989 | Nagaura et al. | |
| 5,245,932 A | 9/1993 | Ujiie | |
| 5,425,932 A | 6/1995 | Tarascon | |
| 5,997,839 A | 12/1999 | Pillai | |
| 6,207,129 B1 | 3/2001 | Padhi et al. | |
| 6,869,547 B2* | 3/2005 | Barker et al. | 252/518.1 |
| 6,942,949 B2 | 9/2005 | Besenhard et al. | |
| 7,323,120 B2 | 1/2008 | Mao et al. | |
| 7,476,467 B2 | 1/2009 | Park et al. | |
| 2003/0160215 A1 | 8/2003 | Mao et al. | |
| 2005/0247914 A1 | 11/2005 | Mao et al. | |
| 2007/0092429 A1 | 4/2007 | Mao et al. | |
| 2007/0243469 A1 | 10/2007 | Kim et al. | |
| 2008/0157027 A1 | 7/2008 | Manthiram et al. | |
| 2009/0242830 A1 | 10/2009 | Mao et al. | |

FOREIGN PATENT DOCUMENTS

| | | |
|---|---|---|
| CA | 2308404 | 11/2000 |
| EP | 1829140 | 9/2007 |

* cited by examiner

*Primary Examiner* — Jane Rhee
(74) *Attorney, Agent, or Firm* — ConocoPhillips Company

(57) ABSTRACT

A battery with a carbonaceous anode and a lithium manganese oxide spinel cathode. The carbonaceous anode is manufactured from graphite particles selected from the group consisting of: synthetic graphite particles, carbon-coated graphite particles, carbonized petroleum coke particles, carbon-coated coke particles and mixtures thereof. The lithium manganese oxide spinel cathode has a valence above 3.5. The production of the carbonaceous anode is obtained by:
 a) determining the initial coulombic efficiency and the specific capacity of the lithium manganese oxide spinel cathode in a cell against lithium metal;
 b) selecting a desired mixture of the graphite particles;
 c) comparing the initial coulombic efficiency of the graphite particles to that of the lithium manganese oxide spinel cathode; and
 d) selecting the appropriate amount and mixture of the graphite particles so that the initial coulombic efficiency of the carbonaceous anode is lower than that of the lithium manganese oxide spinel cathode.

7 Claims, 3 Drawing Sheets

ANODE MATERIAL FOR HIGH POWER LITHIUM ION BATTERIES

CROSS-REFERENCE TO RELATED APPLICATIONS

This application is a non-provisional application which claims benefit under 35 USC §119(e) to U.S. Provisional Application Ser. No. 61/247,418 filed Sep. 30, 2009, entitled "ANODE MATERIAL FOR HIGH POWER LITHIUM ION BATTERIES," which is incorporated herein in its entirety.

STATEMENT REGARDING FEDERALLY SPONSORED RESEARCH OR DEVELOPMENT

None

FIELD OF THE INVENTION

Carbonaceous anode materials for batteries wherein the coulombic efficiency of the carbonaceous anode is lower than the lithium manganese oxide spinel cathode.

BACKGROUND OF THE INVENTION

Carbonaceous materials are widely used in electrical storage cells, also referred to as "batteries" due to their efficiency and reasonable cost. Various forms of carbonaceous materials are used. One such carbonaceous material is graphite, which is known to be useful in rechargeable storage cells, also referred to as "rechargeable batteries". In a salient example, graphitic materials are known to be useful as anode materials in rechargeable lithium ion, "Li-ion" storage cells. Li-ion cells are mainly used as the power sources in portable electronic devices.

As opposed to other classes of rechargeable batteries, i.e., e.g., nickel-cadmium and nickel-metal hydride storage cells, Li-ion cells are increasingly popular due to their relatively higher storage capacity, and their easily rechargeable nature. Due to such higher storage capacity per unit mass or unit volume, Li-ion cells may be produced which meet specific storage and current delivery requirements as they are smaller than similarly rated, nickel-cadmium and nickel-metal hydride storage cells. Consequently, Li-ion cells are popularly used in a growing number of devices, i.e., digital cameras, digital video recorders, computers, etc., where small sized devices are particularly desirable from a utility or consumer standpoint. Nonetheless, rechargeable Li-ion storage cells are not without their shortcomings, certain of which are dependent upon their materials of construction.

Lithium manganese oxide powders, particularly lithium manganese oxide (LMO) spinel with stoichiometric formula $LiMn_2O_4$ powders have been extensively investigated as the cathode material for lithium ion batteries because the material is relatively easy to produce, is inexpensive, environmentally benign, and relatively safe compared to other cathode materials such as lithium cobalt oxide. More importantly, lithium manganese spinel material has a high power capability, which is particularly suitable for energy conversion and storage and high power applications such as hybrid electrical vehicles. However, it has been found that this material exhibits a poor cycle life, particularly at an elevated temperature. Such a poor cycle life has been attributed to the dissolution of LMO in electrolyte because dissolved manganese ions migrate through the separator and deposit on the anode, causing degradation of the anode and cycle life.

Extensive research and development efforts have been spent on solving this problem; the resulting effective methods can be classified into two types: a) modification of the LMO spinel material to reduce the solubility and b) modification of the anode materials to prevent dissolved manganese species from depositing on the anode. Various chemical and physical methods have been used to modify the spinel materials, some of the effective methods include i) doping various metal and non-metal species such as cation species of magnesium, aluminum, and nickel etc. and anion species such as fluoride ($F^-$), ii) coating inorganic salts such as $AlF_3$ and $ZrO$ etc., iii) changing the crystalline structure of the spinel etc. However, it has been found that these effective methods cause a reduction in the reversible capacity in exchange for an improvement of cycle life. The net effect of doping various species is preventing the valence or oxidation state of Mn from being reduced to 3.5+. Use of alternative anode materials such as lithium titanium oxides and amorphous or hard carbons has been reported by many researchers.

It is reported that amorphous carbon or hard carbon powders are currently used as the anode material in the lithium ion cell with modified LMO spinel powder as the cathode material. Because these amorphous or hard carbon powders exhibit a low coulombic efficiency on the initial charge, a thick ionic conductive but electronic insulating layer is built on the carbon surface during the initial formation; such an electronically insulating layer may prevent manganese ions from depositing on carbon particle surface. In addition, the low coulombic efficiency of the anode materials also prevents the cathode from being discharged completely.

However, use of amorphous or hard carbon as the anode material would severely limit the energy density of the lithium ion cells because these materials have several shortcomings, namely i) low density (typically less than 1.8 g/cc), ii) low useable specific capacity (less than 250 mAh/g at an electrode potential below 1.0 volts versus Li), iii) relatively high electrode potential versus Li (this results in a lower cell voltage), and iv) very low coulombic efficiency (less than 75% within a cell). The other known alternative anode materials such as lithium titanium oxide (LTO) spinel with a general formula $Li_4Ti_5O_{12}$ also have shortcomings similar to those of hard carbons. For example, the specific capacity of LTO spinel is about 150 mAh/g and the average potential is 1.5 volts versus Li, compared to about 0.2 volts versus Li for graphite electrode. Furthermore, both hard carbon and LTO materials are fairly expensive.

There is a need for better compatible anode materials for the lithium ion batteries with LMO spinel cathode.

SUMMARY OF THE INVENTION

A battery with a carbonaceous anode and a lithium manganese oxide spinel cathode. The carbonaceous anode is manufactured from graphite particles selected from the group consisting of synthetic graphite particles, carbon-coated graphite particles, carbonized petroleum coke particles, carbon-coated coke particles and mixtures thereof. The lithium manganese oxide spinel cathode has a valence above 3.5. The production of the carbonaceous anode is obtained by:

a) determining the initial coulombic efficiency and the specific capacity of the lithium manganese oxide spinel cathode in a cell against lithium metal;
b) selecting a desired mixture of the graphite particles;
c) comparing the initial coulombic efficiency of the graphite particles to that of the lithium manganese oxide spinel cathode; and d) selecting the appropriate amount and mixture of the graphite particles so that the initial coulombic efficiency of the carbonaceous anode is lower than that of the lithium manganese oxide spinel cathode.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present method describes a battery with a carbonaceous anode and a lithium manganese oxide spinel cathode. The carbonaceous anode is manufactured from a mixture of graphite particles selected from the group consisting of: synthetic graphite particles, carbon-coated graphite particles, carbonized petroleum coke particles and carbon-coated coke particles. The lithium manganese oxide spinel cathode has a valence above 3.5. The production of the carbonaceous anode is obtained by:

a) determining the initial coulombic efficiency and the specific capacity of the lithium manganese oxide spinel cathode in a cell against lithium metal;
b) selecting a desired mixture of the graphite particles;
c) comparing the initial coulombic efficiency of the graphite particles to that of the lithium manganese oxide spinel cathode; and
d) selecting the appropriate amount and mixture of the graphite particles so that the initial coulombic efficiency of the carbonaceous anode is lower than that of the lithium manganese oxide spinel cathode.

The benefits of lowering the electrochemical property of the carbonaceous anode to the oxidation state of the LMO spinel cathode include a better specific capacity (reversible capacity of about 300 mAh/g, usable capacity of 250 mAh/g), better volumetric density than other alternative anode materials such as hard carbon and lithium titanium oxide (Li4Ti5O12) (e.g. 500 mAh/cc at average potential of 0.4 volts versus 420 mAh/cc at 1.5 volts), more desirable initial coulombic efficiency for controlling the state of charge of the LMO spinel cathode, better charge acceptance or over-charge ability and enhanced cycle life.

By manufacturing the carbonaceous anode from a mixture of graphite particles the ability to blend the appropriate graphite particles to produce the desired coulombic efficiency can be achieved. In one embodiment it is possible that the graphite particles chosen comprises at least two members from carbon-coated graphite particles, carbonized petroleum coke particles and carbon-coated coke particles.

Cathode

A suitable LMO spinel cathode can be prepared by heating stoichiometric mixture of lithium and manganese precursors in oxygen gas environment, as described in, for example, U.S. Pat. Nos. 4,246,253; 4,507,371; 4,828,834; 5,245,932; 5,425,932, 5,997,839, or 6,207,129, each of which is incorporated by reference in its entirety. In one embodiment the LMO spinel cathode has a minimum valence above 3.5. This minimum valence number is required for stable cycle life.

Figure 1:
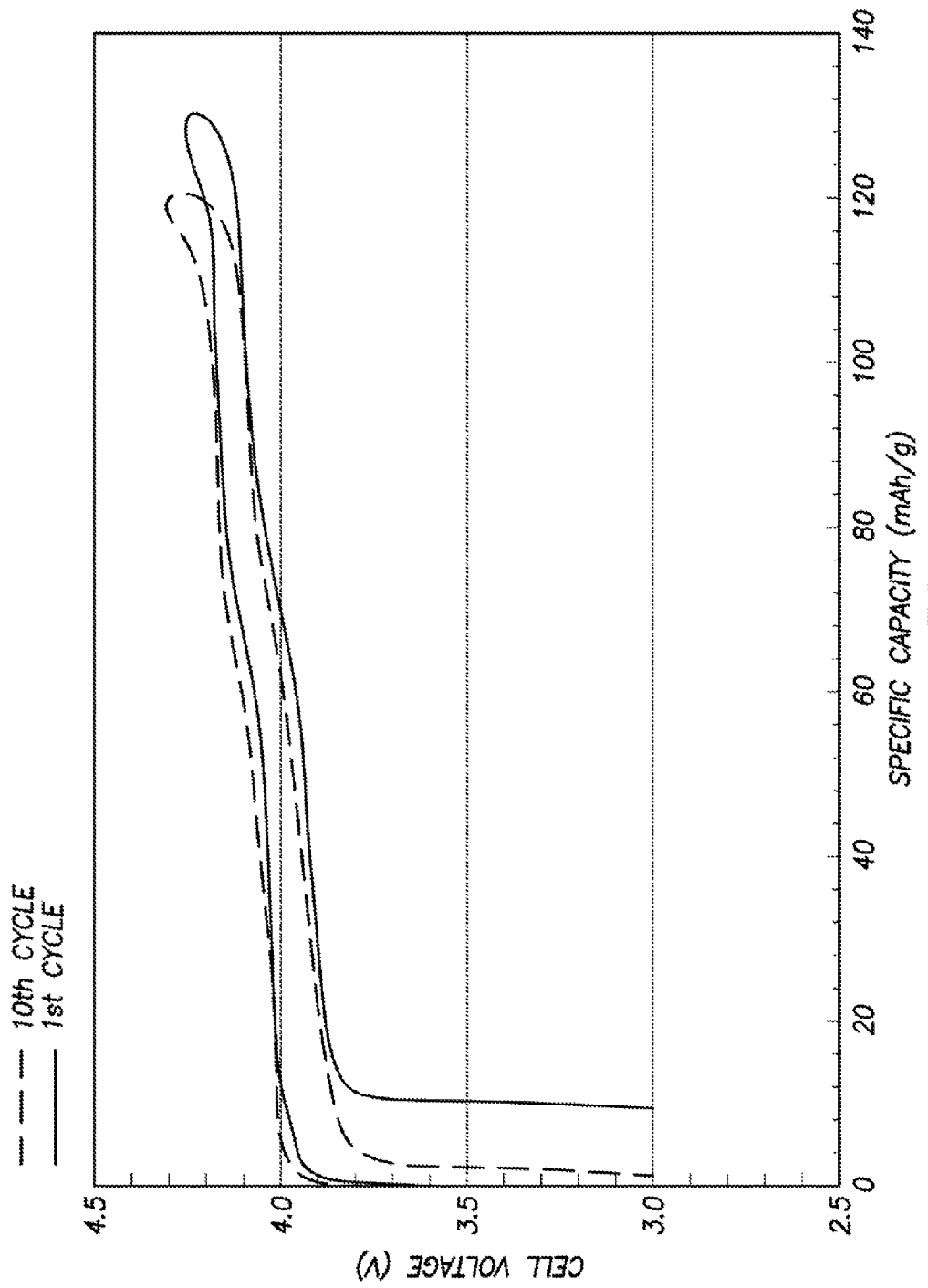
FIG. 1 depicts cell voltage profiles during charge and discharge.
Figure 2:
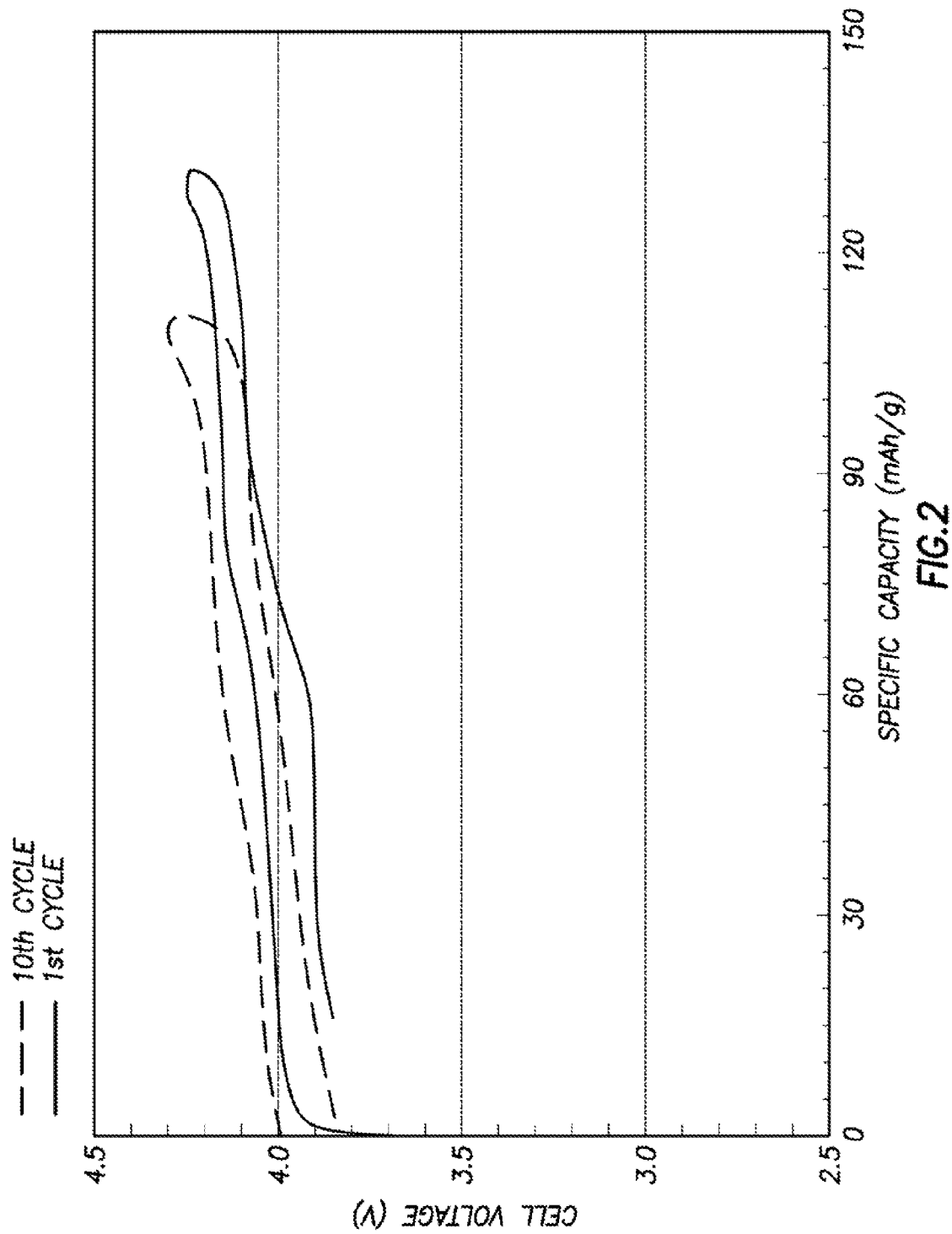
FIG. 2 depicts cell voltage profiles during charge and discharge.

FIGS. 1 and 2 show comparison of the potential profiles of the LMO spinel cathode for two voltage limits: 3 and 3.85 volts. FIG. 1 show the cell voltage profiles during charge and discharge on the $1^{st}$ and $10^{th}$ cycles for the LMO material when the cell is cycled between 3 and 4.3 volts. FIG. 2 show the cell voltage profiles during charge and discharge on the $1^{st}$ and $10^{th}$ cycles for the LMO material when the cell is cycled between 3.85 and 4.3 volts. The initial capacity and coulombic efficiency for the cathode is shown as 119.4 mAh/g and 91.0% for the lower cut-off voltage of 3.0 volts and 114.8 and 87.3% for the lower cut-off voltage of 3.85 volts. Thus, the residual capacity in the cathode would be only 4.6 mAh/g or 3.8% of the reversible capacity (119.4 mAh/g) at the cut-off voltage of 3.85 volts. In the first case, the oxidation state of the LMO spinel is close to +3.5 at 3.0 volts versus Li, the material itself may not be stable during cycling. In the second case, the material is fully discharged at 3.85 volts versus Li, the oxidation state of the LMO material remained above +3.52, thus, the cathode may be fairly stable during cycling. For a Li-ion cell, the initial coulombic efficiency is determined by the electrode with a lower coulombic efficiency. Thus, the low limit of the oxidation state of the LMO spinel cathode can be controlled to a desirable value by selecting a proper anode material.

Carbonaceous Anode

The carbonaceous anode comprises a mixture of at least two graphite particles, synthetic graphite particles, carbon-coated graphite particles, carbonized petroleum coke particles or carbon-coated coke particles.

The graphite particles can be prepared from any conventional method including utilizing crushers or mills. Crushers or mills can give a strong shear force, a strong compression force and a strong impact and therefore can grind graphite in a short time.

The carbon-coated graphite particles can be prepared by thermal chemical methods such as vapor phase deposition and by liquid phase chemical reactions. Any method that can uniformly coat carbon-yielding organic compounds on coke and graphite particles can be used. One such example is a simple heat-treatment of mixtures of graphite and poly(vinyl chloride), PVC, at 800-1000° C. in an argon flow.

The carbon coating reduces significantly the initial irreversible capacity of the graphite in a propylene carbonate-based electrolyte, by suppressing the solvated lithium ion intercalation, and also improves the initial charge—discharge coulombic efficiency. By carbon coating, the specific surface area of graphite particles can be greatly influenced. The crystallinity of the carbon coating layer can be manipulated by changing different variables such as the degree of oxygenation and carbonization temperature etc. It is expected that the resultant composite particle powders have a volumetric density between 1.9 and 2.2 g/cc, depending on the carbon-coating level and a specific capacity of 250 mAh/g or higher.

The use of carbon-coated graphite particles may be advantageous because the surface coating layer would behave like amorphous carbon, having a controllable coulombic efficiency as desired and sloping potential profile whereas the core particle yields a desirable capacity.

The carbonized petroleum coke particles are prepared by the following steps: a) selecting desirable precursors, b) pulverizing the coke to desirable particle size and c) carbonizing the resulting particles.

The petroleum cokes are selected so that the final powders have a specific capacity of at least 200 mAh/g and that the initial coulombic efficiency can be adjusted by thermal treatment. Any mechanical method can be used to pulverize the petroleum, but the preferred particle size is between 1 and 100 micrometers, more preferably between 3 and 50 micrometers. Carbonization is conducted in inert environment such as nitrogen gas, carbon dioxide, and other non-oxidizing gases at temperatures above 600° C. The preferred carbonization temperature is between 650 and 2000° C., more preferably between 700 and 1500° C. The carbonized petroleum coke powders have higher volumetric density (>1.9 g/cc) and also higher useable specific capacity (>250 mAh/g) than typical amorphous or hard carbon powders.

The carbon coated coke particles can be prepared by thermal chemical methods such as vapor phase deposition and by liquid phase chemical reactions. Any method that can uniformly coat carbon-yielding organic compounds on coke and graphite particles can be used. By coating carbon layer on coke particles, both the specific capacity and initial coulombic efficiency of the coke particles can be adjusted to a desirable value.

The carbonaceous anode particles can be sized using any known process of bulk solid size reduction. Examples of suitable sizing methods include but are not limited to impact milling, attrition milling, jet milling, ball milling, fine media milling, and knife milling. Any mechanical milling method may be employed, so long as it is effective for achieving the desired particle size reduction. Such milling methods, conditions and equipment are known to one of ordinary skill in the art.

It is preferred that the size of the carbon-coated graphite particles are typically 0.1 micrometer to 100 micrometers more specifically from 1 micrometers to 50 micrometers. It is preferred that the size of the carbonized petroleum coke particles are typically 0.1 micrometer to 100 micrometers more specifically from 1 to 50 micrometers. It is preferred that the size of the carbon coated coke particles are typically 0.1 micrometer to 100 micrometers more specifically from 1 micrometer to 50 micrometers.

The carbonaceous anode mixture can be a mixture of 5 to 100% carbon-coated graphite particles or more specifically from 30 to 80%, and graphite particles. The carbonaceous anode mixture can also contain from 5 to 100% carbonized petroleum coke particles or more specifically from 10 to 80%. In some embodiments the carbonaceous anode mixture can contain from 5 to 100% carbon coated coke particles or more specifically from 10 to 100%.

In a preferred embodiment, coke or graphite particles are dispersed in an organic solvent at a desirable temperature to form solution A. At the same time, a carbon-yielding compound mixture such as petroleum pitch or coal tar pitch is dissolved in an organic solvent (either the same as that in solution A or different one) to form solution B. Mixing solutions A and B results in deposition of portion or all of the solid carbon-yielding compounds on the graphite particles. The solid carbon-yielding compound coated particles are then separated from the liquid phase by any mechanical method and dried. Subsequently, the dried solid carbon-yielding compound coated particles are subjected to oxidation. The purpose of oxidation is to disrupt the ordered structure of the solid compound by inserting a certain amount of oxygen atoms on the compounds. When the oxidized carbon-yielding compounds are heated in inert environment such as nitrogen gas, they decompose to form amorphous carbon or carbon coating layer that does not exhibit well defined crystalline structure. Oxidation can be done by subjecting the solid carbon yielding compound to oxidizing agent in any form (gas, liquid, and solid) at an elevated temperature. The temperature to carbonize the oxidized carbon-yielding compound is between 500 and 1400° C., preferably between 750 and 1250° C. The last carbonization step results in amorphous carbon-coated special graphite particles, as desired as anode material for the lithium ion batteries, particularly for the lithium ion batteries with lithium manganese oxide as the cathode material.

In another embodiment, graphitize-able cokes are selected, milled to a desirable particle size. The resulting coke particles are then coated with solid carbon-yielding compounds, as described above. Subsequently, the coated coke particles are oxidized and heated in inert gas at a temperature that is predetermined so that the overall specific capacity would not exceed 320 mAh/g and the carbon coating layer has an amorphous structure whereas the coke core has become substantially graphite.

In another embodiment, petroleum cokes are selected and milled to a desirable particle size. The resulting particles are carbonized in inert gas such as nitrogen gas at a temperature between 500 and 2200° C., preferably between 750 and 1450° C.

Lowering the Coulombic Efficiency

The oxidation state of the LMO spinel cathode is limited by lowering a carbonaceous anode materials by the following steps:

a) determining the initial coulombic efficiency and the specific capacity of the lithium manganese oxide spinel cathode in a cell against lithium metal;
b) selecting a desired mixture of the graphite particles;
c) comparing the initial coulombic efficiency of the graphite particles to that of the lithium manganese oxide spinel cathode; and
d) selecting the appropriate amount and mixture of the graphite particles so that the initial coulombic efficiency of the carbonaceous anode is lower than that of the lithium manganese oxide spinel cathode.

The desirable initial coulombic efficiency of a chosen anode is not a fixed value, it depends on the LMO spinel cathode used, but it should be lower by at least 1%, preferably by 2 to 10% than that of the LMO spinel cathode. By choosing such carbonaceous anode materials, the oxidation state of the LMO spinel cathode would be kept at a value higher than +3.51 in a cell after the first cycle even though the initial oxidation state of the LMO spinel is +3.5.

Electrochemical Test

Coin cells with lithium metal foil as the counter electrode were used to evaluate the anode and cathode material. First, a carbon powder was processed into thin film on copper foil (10 μm) by typical solvent casting method. The mass loading of the thin films was controlled at 7 mg/cm². The coated thin films were pressed through a rolling calendar to a density of about 1.4 g/cc. Disks of 1.6 cm² were punched out from the pressed films as electrodes. All the carbon electrodes were made in the same way and with the same composition: 92% active material, 2% acetylene carbon black (from Alfa), and 6% polyvinylidene fluoride (PVDF). The separator consisted of one piece of glass matt (Whatman® FG/B) and one piece of porous polypropylene film (Cellguard® 2300) that was placed on the lithium metal side. The electrolyte was 1 M $LiPF_6$ in 40% ethylene carbonate, 30% diethyl carbonate, and 30% dimethyl carbonate mixture. The cells were cycled with the following charging and discharging scheme: charging at constant current of 1 mA till the cell voltage reached 0.0 volt and further charging at constant voltage of 0.0 volt for one hour or till the current reached 0.02 mA, and then discharging at constant current of 1 mA till the cell voltage reached 2.0 volts. The initial coulombic efficiency and specific capacity was calculated by dividing the total electrical charges passed during charging by that during discharging and by dividing the total electrical charge during discharge by the electrode weight on the first cycle.

State of Charge of Electrodes

Figure 3:
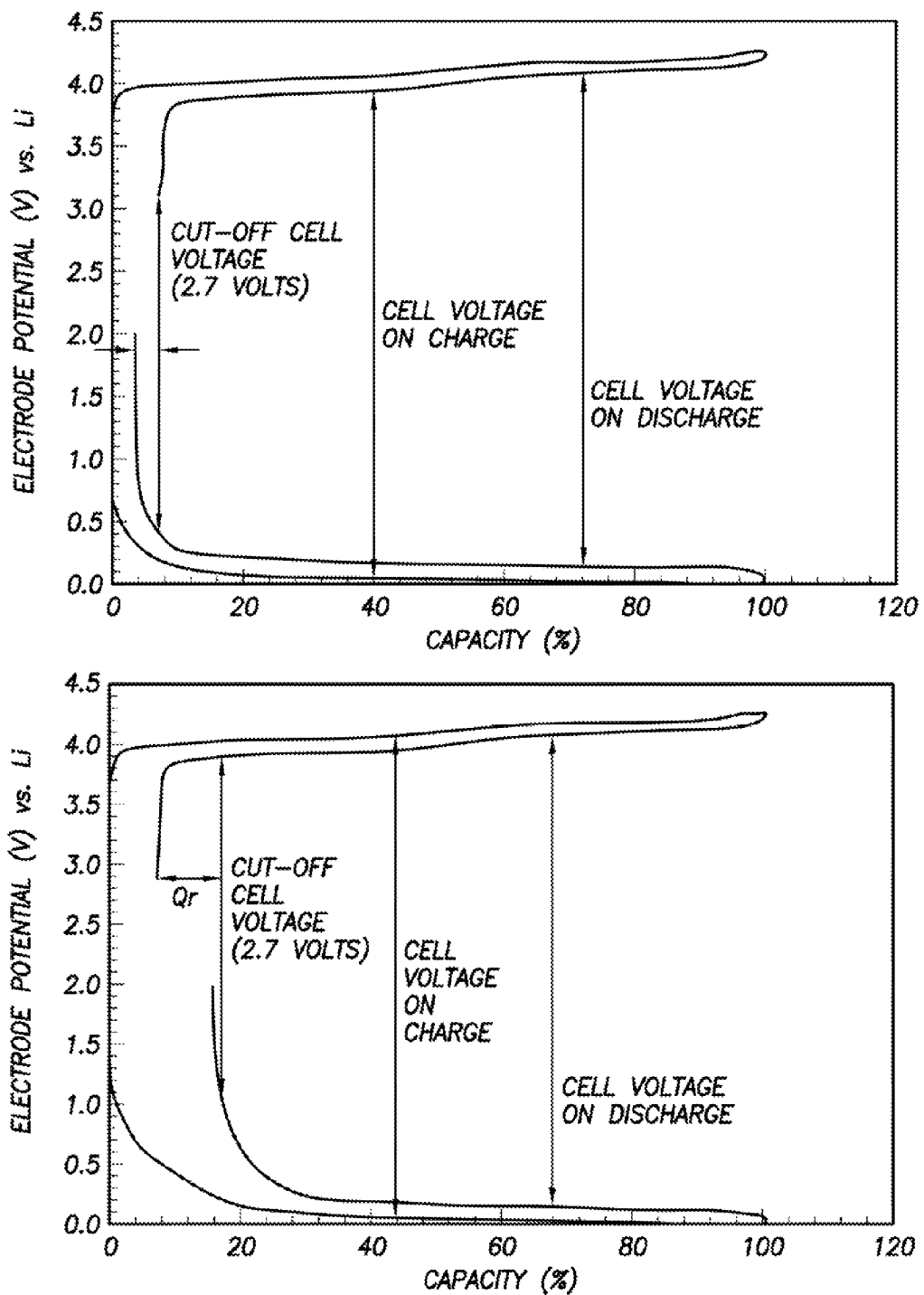
FIG. 3 depicts electrode potential profiles.

FIG. 3 illustrates two scenarios of the state of charge of both the positive and negative electrodes at the end of discharge for the cells using the negative electrodes with different initial coulombic efficiencies. FIG. 3 describes electrode potential profiles of $LiMn_2O_4$ and carbonaceous electrodes and capacity remaining at each electrode at the discharge cut-off cell voltage, (a) the initial coulombic efficiency of the anode is greater than that of the cathode, (b) the initial coulombic efficiency of the anode is lower than that of the cathode. The LMO spinel electrode (positive electrode) has an initial coulombic efficiency of about 91%, the negative carbonaceous electrode has the coulombic efficiency of 96% in case (a) and 84% in case (b), respectively. At the end of discharge (the cut-off cell voltage of 2.7 volts) in case (a), the LMO electrode is completely discharged as its potential drops to 3.0 volts whereas the negative electrode has not been fully discharged; a few percentages of the capacity still remain in the electrode. In case (b), a large portion of the capacity still remains in the positive electrode at the end of discharge (the same cut-off cell voltage of 2.7 volts) whereas the negative electrode is almost fully discharged, depending on the potential profile. In the case (b), the LMO electrode would never be fully discharged under normal condition.

Because the fully discharged LMO (the oxidation state of +3.5) has higher solubility in electrolyte than partially discharged LMO (the oxidation state of >3.5+), the LMO in the cell of case (a) would dissolve more than the one in case (b). On the other hand, if the remediation methods such as anion and cation doping and coating of LMO are to prevent LMO from being fully discharged to an average valence of 3.5 or lower, the cell in case (b) actually achieves that purpose. Therefore, it can be seen that use of a proper carbonaceous anode may achieve the results as more complicated and expensive modification of LMO particles such as doping and coating etc. The key feature required for such an carbonaceous anode is that the cell voltage must be dictated by the anode electrode near the end of discharge.

EXAMPLES

In the following examples the manufacture of the carbonaceous anode from a mixture of graphite powders allows for blending of the graphite particles so that an appropriate coulombic efficiency can be achieved.

Example 1

A synthetic graphite particle powder with an average particle size of 5 µm and 100% below 30 µm was chosen in this example. The graphite powder had an initial coulombic efficiency of 95% and a specific capacity of 285 mAh/g. The initial coulombic efficiency of this material is higher than that of a typical LMO spinel cathode (typically less than 94%), it would cause the cathode to discharge completely on discharge, which is not desirable.

20 grams of the above material were dispersed in 80 grams of xylene to form solution A. 14 grams of a petroleum pitch were dissolved in 14 grams of xylene to form solution B. Both solutions A and B were heated to the boiling point and then mixed together. Subsequently, the mixture solution was cooled to ambient temperature. The resulting solid particles were separated out by filtration under vacuum and washed thoroughly with xylene. The resulted particles were dried at 100° C. under vacuum for 10 hours. The dry powder weighed 24.2 grams. Thus, the graphite powder has been coated with 17.2 wt % pitch. The pitch-coated graphite powder was processed further through stabilization and carbonization as follows: The pitch-coated powder was slowly heated at 1° C./minute to 285° C. and held at 285° C. for 12 hours under reduced air pressure (~−22 in Hg), the heat was removed and the powder was cooled to ambient temperature. The resulted powder was split into two, and carbonized in nitrogen gas at 950 and 1150° C. for two hours, respectively.

The above two powders were evaluated as anode material in coin cells. The initial coulombic efficiency and specific capacity were found to be 81.0 and 84.2%, and 268 mAh/g to 271 mAh/g, respectively. The volumetric density of these powders was 2.1 g/cc, significantly higher than those of amorphous or hard carbon materials. Thus, when these powders are used as anode material in a lithium ion cell with a LMO spinel cathode, such lithium ion cells would have an initial coulombic efficiency of at most 81.0% and 84.2%, leaving the LMO spinel cathode at least 10 to 6% residual capacity.

Example 2

A petroleum coke from a ConocoPhillips refinery plant was selected and milled to a powder with an average particle size of 5 micrometers using an air-jet mill. The milled coke powder was then carbonized in nitrogen gas for two hours at 1050 and 1200° C., separately. The initial coulombic efficiency and specific capacity of the two powders were determined to be 75 and 76%, and 300 mAh/g and 279 mAh/g, respectively. The density of the powders was 1.96 and 2.01 g/cc. The initial coulombic efficiency was comparable with those of amorphous or hard carbon powders reported in literature, but the density and useable capacity is higher than those of amorphous or hard carbons.

Example 3 a mixture of graphite and calcined petroleum coke powder was evaluated in this example. The mixture of 50% the synthetic graphite particle powder in Example 1 and 50% the coke powder calcined at 1200° C. in Example 2 was evaluated as anode material. The resulting powder was found to have an initial coulombic efficiency of 85% and specific capacity of 287 mAh/g. The mixture has a real density of 2.1 g/cc. When this mixture is used as the anode material in the lithium ion batteries with a LMO spinel cathode, the cathode would have a residual capacity of about 6% at fully discharged state, effectively keeping the oxidation state of the LMO above +3.5. In addition, this mixture has a significantly higher density than a typical amorphous carbon or hard carbon, Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of any reference is not an admission that it is prior art to the present invention, especially any reference that may have a publication date after the priority date of this application.

The invention claimed is:

1. A battery comprising:
    a carbonaceous anode comprising graphite particles selected from the group consisting of synthetic graphite particles, carbon-coated graphite particles, carbonized petroleum coke particles, carbon-coated coke particles and mixtures thereof; and a lithium manganese oxide spinel cathode with a valence above 3.5, wherein the carbonaceous anode is obtained by:
   a) determining the initial coulombic efficiency and the specific capacity of the lithium manganese oxide spinel cathode in a cell against lithium metal;
   b) selecting a desired mixture of the graphite particles;
   c) comparing the initial coulombic efficiency of the graphite particles to that of the lithium manganese oxide spinel cathode; and
   d) selecting the appropriate amount and mixture of the graphite particles so that the initial coulombic efficiency of the carbonaceous anode is lower than that of the lithium manganese oxide spinel cathode wherein the cathode is not fully discharged at the cut-off cell voltage and wherein the initial coulombic efficiency of the anode is at least 2% lower than that of the cathode when each electrode is evaluated against a Li metal and wherein the initial coulombic efficiency of the carbonaceous anode is evaluated in a half cell against lithium metal, and the useable specific capacity of the anode is greater than 250 mAh/g measured in a cell against the Li metal at a cut-off voltage of 1.5 volts.

2. The battery of claim 1, wherein the volumetric density of the anode is between 1.85 and 2.15 g/cc which is measured using helium gas displacement technique.

3. The battery of claim 1, wherein the mixture comprises at least two members of the group of graphite particles.

4. The battery of claim 1, wherein the amount of carbon-coated coke particles range from 3% to 100% of the total anode mixture.

5. The battery of claim 1, wherein the amount of carbon-coated graphite particles range from 50% to 100% of the total anode mixture.

6. The battery of claim 1, wherein the amount of carbonized petroleum coke particles range from 5% to 100% of the total anode mixture.

7. The battery of claim 1, wherein the average oxidation state of the lithium manganese oxide spinel cathode does not drop below 3.525 after an initial formation cycle.

\* \* \* \* \*